Feb. 9, 1960 J. J. KOWALIK 2,924,061
ROTARY RAKE WITH OSCILLATING STRIPPER
Filed July 5, 1957 4 Sheets-Sheet 1
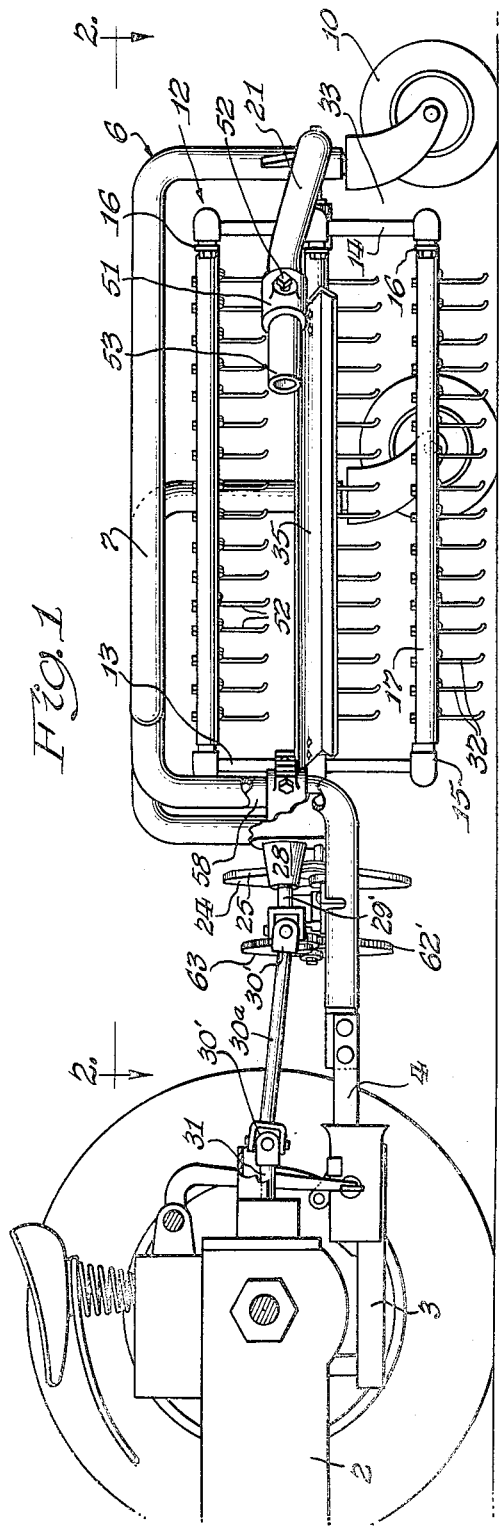
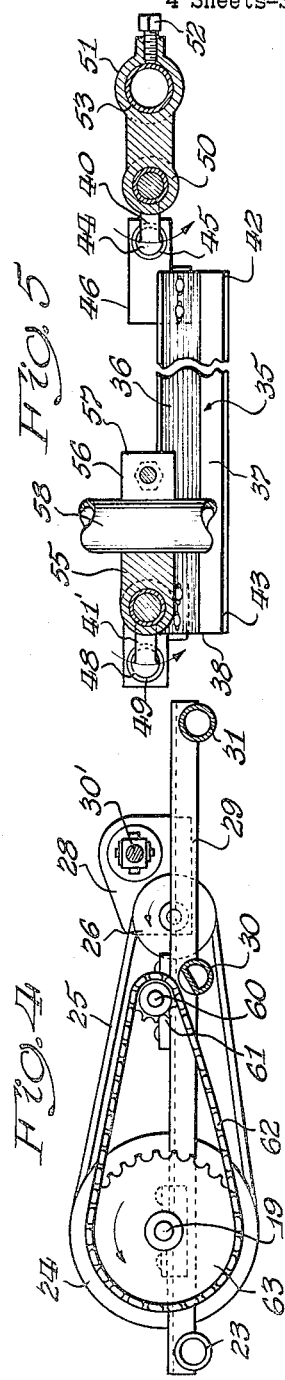
Inventor
John J. Kowalik
Paul O. Pippel
Attorney

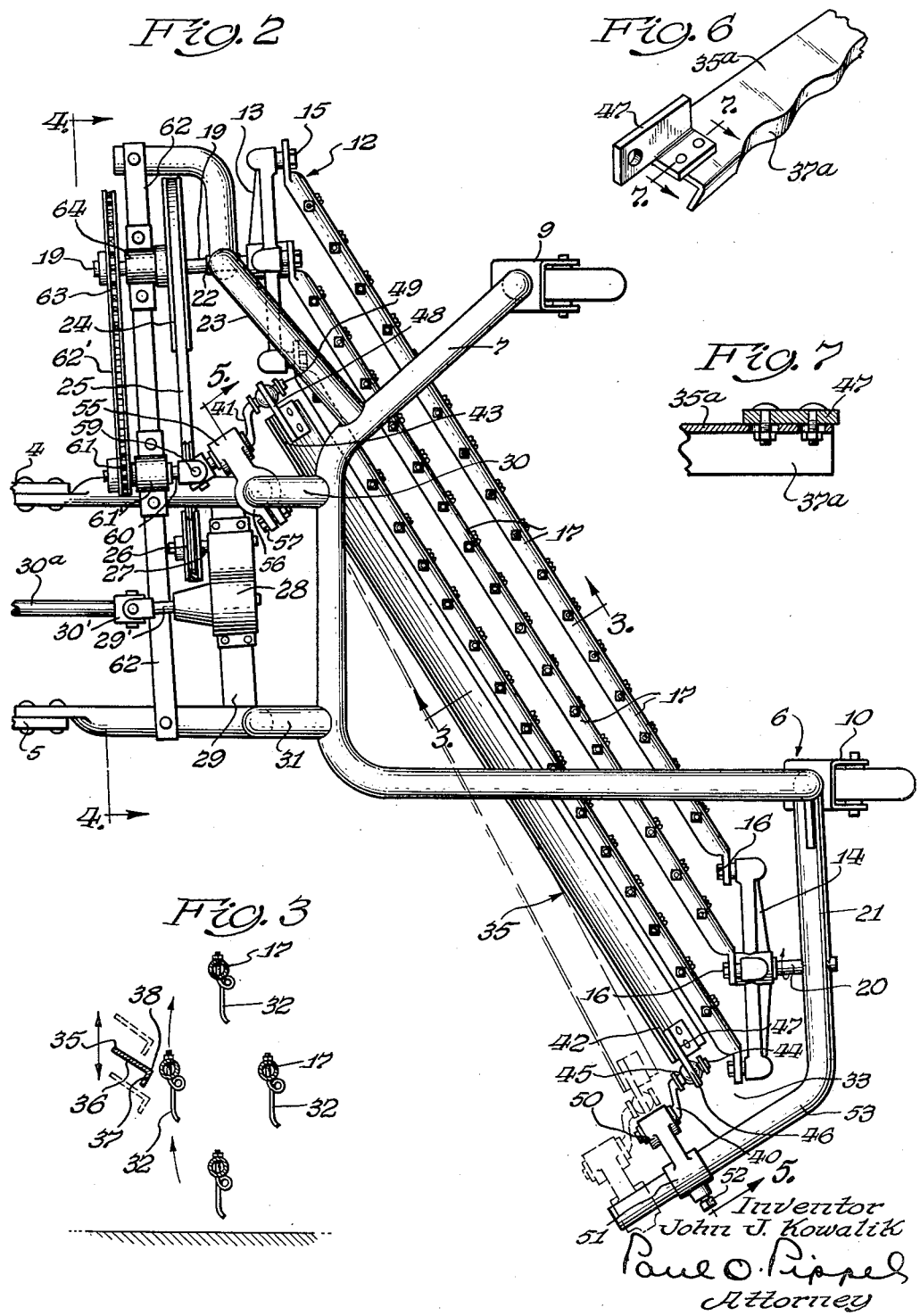

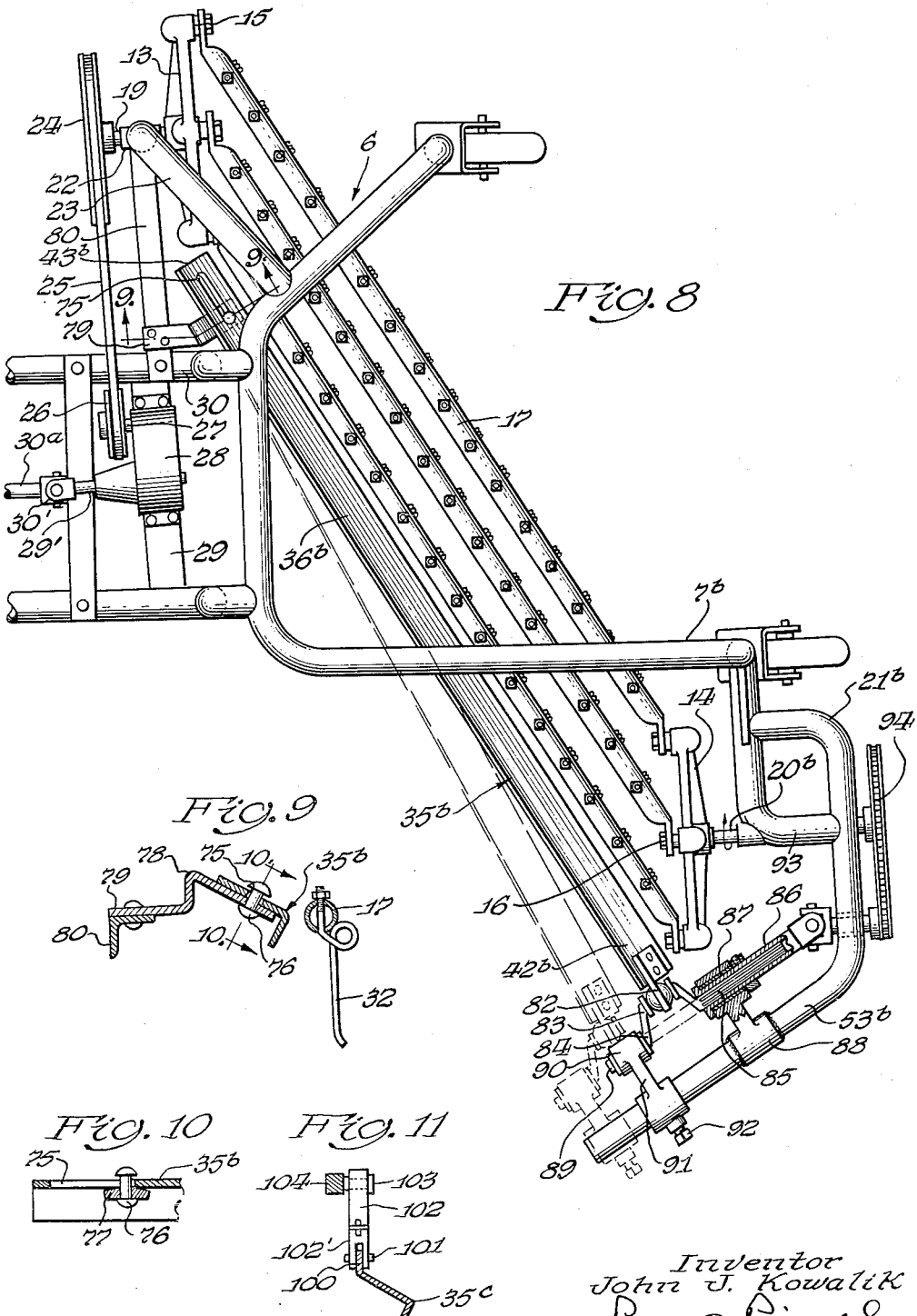

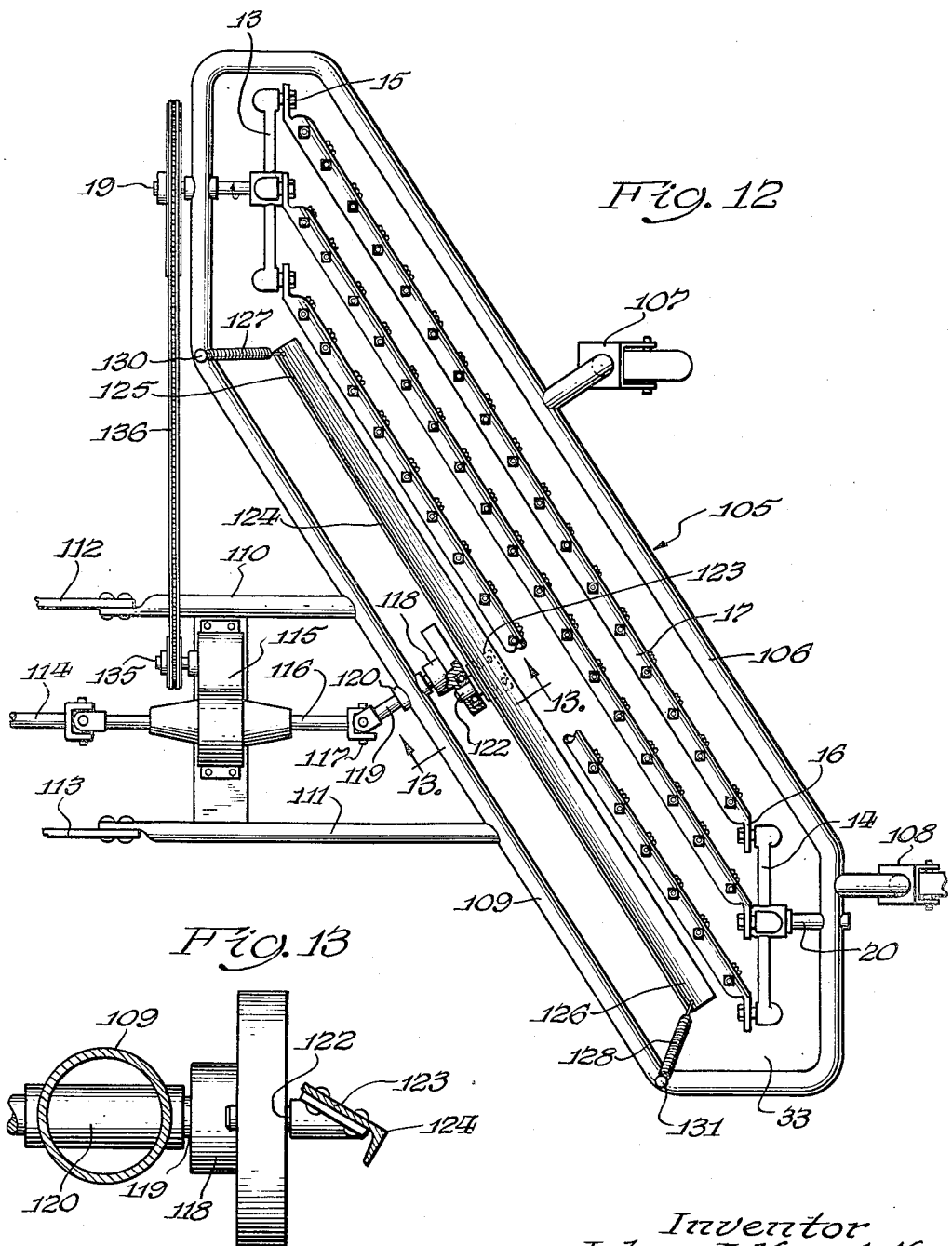

United States Patent Office 2,924,061
Patented Feb. 9, 1960

2,924,061

ROTARY RAKE WITH OSCILLATING STRIPPER

John J. Kowalik, Glenview, Ill., assignor to International Harvester Company, Chicago, Ill., a corporation of New Jersey Application July 5, 1957, Serial No. 670,238

22 Claims. (Cl. 56—377)

This invention relates to side delivery rakes and more particularly to stripper means therefor.

It is a customary practice to provide in a side delivery rake of the type which comprises a rotating reel including a plurality of bars with raking fingers thereon, a plurality of stripper bars which interdigitate with the fingers and which function to strip the fingers off the crops as the fingers emerge from the crops after having performed their particular raking operation. These stripper bars not only add to the weight of the rake basket but the basket structure itself must be greatly strengthened, and they are costly and dictate a particular placement of the raking fingers to prevent straddling to minimize breakage of the fingers. This particular placement of the fingers is not always most desirable, but at best is a compromise.

In certain type of rakes commonly known as parallel bar side delivery rakes it has been customary, especially in the European countries, to provide a stationary stripper board and to eliminate all of the stripper bars. This structure has operated at best only fairly at slow operating speeds and only in particular crops such as long hay.

A general object of the invention is to provide a novel stripper assembly for the rake teeth of a side delivery rake reel, the stripper assembly being moved rapidly with a downward component in order to shake the crops loose therefrom and also from the teeth.

A further object of the invention is to provide a novel stripper for a side delivery rake of the type described wherein the stripper moves vertically as well as laterally and timed to move downwardly as the teeth are ascending and also move the crops laterally toward the discharge side of the rake.

Another object of the invention is to provide a novel stripper bar which has a stripping surface formed and arranged to provide lateral thrust on the crops toward the delivery end of the rake.

These and other objects of the invention will become more apparent from the specification and the drawings wherein:

Figure 1 is a side elevational view partially broken away of a rake incorporating one form of stripper mechanism in accordance with the invention, the rake being shown in association with a tractor fragmentarily shown;

Figure 2 is a plan view of the construction shown in Figure 1 taken substantially on the line 2—2 of Figure 1;

Figure 3 is a transverse vertical sectional view taken substantially on the line 3—3 of Figure 2;

Figure 4 is a transverse vertical sectional view taken substantially on the line 4—4 of Figure 2;

Figure 5 is an enlarged broken apart transverse vertical sectional view taken substantially on the line 5—5 of Figure 2;

Figure 6 is a fragmentary perspective view of a modified stripper board;

Figure 7 is an enlarged longitudinal sectional view taken substantially on the line 7—7 of Figure 6;

Figures 8 through 10 illustrate a modified form of the invention, Figure 8 being a plan view comparable to Figure 2 illustrating a modified form of the invention; Figure 9 is a vertical sectional view taken substantially in the planes indicated by the line 9—9 of Figure 8; Figure 10 is a longitudinal sectional view of the stripper board taken substantially on the line 10—10 of Figure 9;

Figure 11 illustrates a modified form of mounting for the structure shown in Figure 8 and the view being essentially similar to that shown in Figure 9;

Figures 12 and 13 illustrate a further modification of the invention, Figure 12 being a top plan view and Figure 13 being a sectional view taken substantially on the line 13—13 of Figure 12.

Describing the invention in detail and having particular reference to Figures 1 through 5, there is shown a tractor generally designated 2 which forms the motive unit for the rake and may be of any conventional form. It will be understood that any other power could be used such as wheel drive. The tractor is provided with a hitch 3 commonly known as the International Harvester two-point hitch into which are socketed the prong members 4 and 5 of the rake generally designated 6. The rake 6 comprises a main framework 7 which at its forward end is connected to the prongs 4 and 5 and its rearward end is supported by caster assemblies 9 and 10, the frame supporting a reel generally designated 12.

The reel 12 comprises a pair of laterally and axially displaced front and rear spiders or end members 13 and 14 which provide connections at 15 and 16 for the rake or toothed bars 17 extending therebetween, the connections 15 and 16 paralleling the axes of the shafts 19 and 20 of the end members 13 and 14 and being radially outwardly displaced therefrom. It will be seen that the shaft 20 is suitably anchored to a lateral arm extension frame member 21 which is integral with the main frame 7 and extending leftwardly therefrom as viewed from the rear and that the spindle or shaft 19 is supported by bearing assembly 22 which is mounted on the rightwardly extending frame arm 23 of the main frame.

The shaft 19 extends forwardly and is connected to a pulley 24 which is driven by belt 25 which in turn is driven by pulley 26 which is driven from the output shaft 27 of a gear box 28 which is suitably mounted by frame structure 29 from the forwardly extending draft frame portions 30 and 31 of the main frame. The gear box 28 has an input shaft 29' which is connected through suitable shafting 30a, which includes universal joints 30', to the power take-off 31 to the tractor.

It will be understood that the rake bars with the teeth 32 thereon move or orbit in an elliptical path as seen in Figure 3 and that the teeth are normally vertically disposed and on the backside of the reel move downwardly and forwardly and on the forward side of the reel move upwardly and laterally rearwardly toward the delivery end 33 of the rake, thereby the teeth additively kick the hay or other forage crops forwardly and laterally and finally discharge it off the delivery or trailing end of the obliquely disposed reel as is well-known to those skilled in the art.

There is provided a stripper means 35 for clearing the teeth 32 as they withdraw from the crops and ascend on the forward side of the rake and this stripper bar 35 comprises, preferably, a flat metal angle member including a broad top web 36 and an inner downwardly extending flange 37 thereby presenting a corner 38 toward the teeth 32. In each embodiment of the invention the stripper 35 is driven in timed sequence with the rake bars so that as each rake bar begins its ascent on the forward side of the rake withdrawing the teeth from the hay the stripper member moves downwardly and laterally toward the discharge side of the rake. In this position the stripper is horizontally or in fore and aft alignment with the respective toothed bar. The oscillatory movement of the stripper is accomplished in the present embodiment by means of a pair of cranks 40 and 41 disposed at the rear and forward or trailing and leading ends 42 and 43 respectively of the stripper member, the crank 40 being provided on its throw 44 on which is mounted a bearing 45 which has a universal ball and socket connection 46 with the rear extremity 42 of the stripper means 35. In the present instance this is accomplished, as well seen, by means of the ball being provided on the bearing member 45 and a suitable aperture being provided on the connecting bracket 47 which mounts on and connects by means of rivets or the like to the trailing end 42 of the stripper member. Similarly there is a universal connection 48 between the forward end 43 of the stripper member 35 and the throw 49 of the crank 41.

Crank 40 is anchored or adjustably rotatively supported in a bearing 50 which comprises a sleeve portion 51 adjustably connected by a locking nut 52 to a forward extension 53 of the arm 21 of the main frame. Thus the positioning of the trailing end of the stripper member 35 is at the option of the operator and in conditions of heavy crops he may wish to move this end forwardly and under light conditions rearwardly to space the stripper board farther or closer to the rake teeth as conditions dictate.

The leading end of the stripper board is mounted by the crank 41 in a bearing 55 which includes a clamp portion 56. The clamp portion 56 has a split collar assembly 57 which adjustably clamps said clamp portion and split collar assembly 57 on a vertical portion 58 of the frame member 30. Thus it will be seen that the bearing assembly 55 is movable toward and away with respect to the rake teeth in order to properly position the same fore and aft and lengthwise of the reel.

The forward end of the crank 41 is connected by means of a universal joint 59 to the driven shaft 60 which is supported on a bearing 61' from the mounting framework portion 62 suitably connected to the portions 30 and 23 of the main frame. The forward end of the shaft 60 is connected to a sprocket 61 which is driven by chain 62' from a sprocket 63 which is connected to the shaft 19 of the forward spider or end member 13, the shaft 19 additionally being supported on a bearing 64 which is carried by the aforementioned support beam 62.

Thus it will be seen that as the rake is rotated as indicated by the arrows in Figure 3 the stripper board or member will be rotated from its uppermost position downwardly and also laterally of the rake toward the delivery end of the rake and then upwardly and then repeat the cycle. Inasmuch as the driving crank 41 is driven by timing chain 62' from the shaft 19 which also drives the spider 13, it will be seen that the proper timing and sequence of operation is maintained and inasmuch as there are herein shown four bars the stripper member would be moving about four times as fast as the reel in the sequence heretofore described inasmuch as sprocket 63 is four times larger than sprocket 61.

Thus an active stripper member is provided which continuously moves the hay downwardly off the rake teeth and at the same time has a tendency to move it laterally toward the discharge end of the rake.

Referring now to the structure shown in Figures 6 and 7, it will be seen that the stripper member designated 35a is substantially the same as that shown in member 35 in the previous embodiment with the exception that the operating edge or flange 37a which corresponds to flange 37 of the previous embodiment is scalloped or corrugated to provide a greater aggressiveness for the stripper to move the hay laterally.

Referring now to the embodiment shown in Figures 8, 9 and 10, wherein parts identical with those shown in the previous embodiment are identified by the same reference numeral, it will be seen that the stripper member 35b is identical with member 35 but that at the forward end 43b the plate portion 36b is provided with a longitudinal slot 75 and is loosely connected by rivet 76 to an underlying plate portion 77 of a bracket 78 which has a mounting portion 79 suitably supported on a support member 80 which is connected between the arm portion 23 and the portion 30 of the frame. It will be seen that because the rivet 76 is loose and the plate portion 77 bowed upwardly (Fig. 10) the member 35b may cant vertically and oscillate longitudinally as well as laterally. The trailing end 42b is connected by a universal joint or connection 82 to the throw 83 of the crank 84 which has a first driving portion 85 drivingly connected to a driving shaft 86 through a longitudinally adjustable spline connection, the shaft 86 being suitably carried in a bearing 87 from a bracket 88 which is mounted on the forward extension 53b of the arm construction 21b. The crank has a second shaft portion 89 which is carried in a bearing 90 from a bracket 91 which is sleeved on the portion 53b and held thereon in several adjusted positions spaced closer or farther from the periphery of the reel in order to determine the position of the stripper board and held by means of an adjusting and tightening screw 92.

Thus it will be seen that in this embodiment the most active part of the stripper member is at the delivery end of the rake where most of the crops bunch up and that this action progressively decreases toward the forward or leading end of the rake where a minimum amount of crops is handled.

The drive for the stripper is through the rake to member 14 connected to shaft 20b which is journalled in bearing 93 on portion 21b. The rear end of shaft 20b drives a chain and sprocket assembly 94 which drives sleeve 86.

Referring now to the embodiment shown in Figure 11 which is comparable to that in Figure 9, it will be seen that in lieu of the slotted connection of the board 35b the stripper board 35c has an upwardly extending forward flange portion 100 which is pivoted by means of a pin 101 on a substantially horizontal axis from the lower end of a swing link 102 by a swivel 102', the upper end of which is pivoted on a generally horizontal axis by means of a pin 103 to an adjacent frame member 104 suitably connected to the main frame structure 7 of the rake.

Referring now to the embodiment to the invention shown in Figures 12 and 13, it will be seen that the rake frame is herein shown as a somewhat rhomboidal structure generally designated 105 to the rear member 106 of which there are connected the caster wheel assemblies 107 and 108. The forward beam member 109 of the structure is connected to the forwardly extending draft arms 110 and 111 which in turn connect to the hitch parts 112 and 113 for attachment to the tractor as shown in Figure 1. It will be understood that the nature and the type of frame construction in any of the embodiments is merely incidental to the invention and that any form of support structure can be used. In the present instance it will be seen that the power take-off shafting 114 terminates in a gear box 115 from which there rearwardly extends a stripper bar driving shaft 116 which drives through a universal joint 117 the crank or eccentric 118, the shaft 119 of which is suitably mounted in a bearing 120 carried by the front bar 109. The eccentric or crank 118 has its throw 122 connected rotatively to the intermediate portion 123 of the stripper bar 124 which extends generally parallel to the rake bars 17, which are identical with those of each of the previous embodiments. In this embodiment all of the structure which is identical with that previously described will be identified with identical reference numerals. The forward and rear ends 125 and 126 of the stripper bar are connected to the lower ends of yieldable members in the form of springs 127 and 128 which diverge upwardly and are inclined forwardly and at their upper ends are connected as at 130 and 131 to rod structures which are dependent from the member 109. Thus the stripper bar 124 is held in assembly with the crank and in proper location of position with respect to the reel. It will be understood that the tension of springs 127 and 128 may be varied in order to obtain different effects of motion in oscillation of the stripper bar as may be found from actual experience to be most suitable in the particular crop conditions under which the same is being operated and to this end the springs 127 and 128 may be adjustable. The gear box 115 has an output shaft 135 which drives chain and sprocket drill 136 which drives the shaft 19 of spider 13.

Thus it will be readily appreciated that a novel, inexpensive and efficient stripper means is provided for side delivery rakes which entirely obviates the need for stripper bars and the like and which not only strips the teeth but also assists in delivering the crop toward the delivery end of the rake.

What is claimed is:

1. In a side delivery rake having a frame and a raking reel rotatably mounted on said frame and said reel having a plurality of tooth bars moving in an orbital path, the improvement comprising: a crop stripper mounted on the frame adjacent to the reel and extending generally parallel thereto, and means drivingly connected to said stripper for moving the same in a generally vertical orbit in stripping relation to the tooth bars.

2. In a side delivery rake, a frame, a rake reel rotatably mounted thereon and having a plurality of toothed bars extending and moving in an orbit transversely of the direction of travel, the improvement comprising: a stripper bar disposed forwardly of the reel in stripping relation to the toothed bars, and crank means mounted on the frame on an axis transverse to said bars and driving said stripper bar in an orbit passing close to the path of said bars for stripping said toothed bars.

3. The invention according to claim 2 and said crank means comprising at least one crank, and the axis thereof disposed generally horizontally.

4. The invention according to claim 2 and timing means interconnecting the stripper bar with the reel for timing said toothed bars with said stripper bar in a relation such that as each bar ascents, the stripper bar descends.

5. In a side delivery rake having a frame, a rake reel rotatably mounted thereon and including toothed bars orbiting in a substantially vertical plane transverse to the line of draft of the rake, the improvement comprising: stripper means mounted on the frame ahead of the reel in cooperative relation thereto, and driving means operatively connected to the stripper means for orbiting the same in a generally vertical plane with a lateral component toward the delivery end of the reel.

6. The invention according to claim 5 and said driving means comprising crank means connected to said stripper means at a point intermediate the ends of the latter, and means yieldably supporting said stripper means from the frame at points spaced from said intermediate point.

7. The invention according to claim 5 and said driving means including crank means connected to said stripper means at spaced points thereon.

8. The invention according to claim 5 and said driving means including crank means connected to said stripper means at one point, and a slotted connection supporting said stripper means from the frame at another point.

9. The invention according to claim 5 and said driving means including means connected to said stripper means at one point and a swing link connected to the stripper means at another point and suspending the same from the frame.

10. The invention according to claim 5 and said stripper means comprising a bar having a crop-engaging corrugated surface.

11. For use in a side delivery rake of the type comprising a rotary reel having a plurality of toothed bars sweeping upwardly on the forward side of the reel, the improvement comprising: at least one elongated stripper member supported ahead of said reel in stripping relation to said toothed bars, and driving means operatively connected to said member for orbiting the same in a plane tangentially to the path of movement of said bars in wiping relation to said toothed bars.

12. In a side delivery rake having a frame, a rake reel rotatably mounted thereon and including toothed bars orbiting in a substantially vertical plane transverse to the line of draft of the rake, the improvement comprising: stripper means mounted on the frame ahead of the reel in cooperative relation thereto, and driving means operatively connected to the stripper means for orbiting the same in a generally vertical plane with a lateral component toward the delivery end of the reel, said stripper means comprising a bar having a crop-engaging corrugated surface, and said reel extending diagonally to the direction of travel and having a leading end and a trailing end and said stripper member having leading and trailing ends adjacent to the corresponding ends of the reel, and means adjustably supporting said trailing end of the stripper member for positioning said trailing end of the member at various distances from said reel.

13. For a side delivery rake having a support frame, a rake reel rotatably mounted thereon and having a front side and rake bars moving upwardly and laterally on said front side, the improvement comprising: a stripper member extending generally parallel to the rake in front immediately ahead of the front side thereof, and means mounting said member on fore and aft axes and constraining said member to move up and down in a vertical plane tangent to the path of movement of the rake bars on said front side of the rake, and means drivingly connected to said member for moving the same laterally in stripping relation to the rake bars.

14. In a side delivery rake, a frame, a reel having raking teeth, and having a pair of end members spaced axially and laterally apart and supported on generally horizontal parallel axes from the frame, drive means operatively associated with the rake, a shaft connected to at least one of said end members, a stripper element disposed in front of the reel in fore and aft alignment therewith, means operatively suspending said element from the frame, a crank rotatably supported on the frame and drivingly connected to the element, and drive-transmitting means operatively connecting said shaft with said crank for driving said element in timed relation with the teeth on the reel for stripping the same.

15. The invention according to claim 14 and said crank connected to one end of said element.

16. The invention according to claim 14 and said suspension means including yieldable elements.

17. The invention according to claim 14 and said crank connected to said element intermediate its ends, and said suspension means comprising springs supporting opposite ends of said element from the frame.

18. The invention according to claim 17 and said springs diverging upwardly and extending diagonally upwardly and forwardly of the reel.

19. For a side delivery rake of the type having an ambulatory support structure and a rake reel rotatably mounted thereon and having a plurality of tooth bars orbiting in a path transverse to the line of draft of the rake, the improvement comprising: a stripping member in front of the reel, resilient means suspending the member from the frame, and driving means connected to the member for moving it in wiping relation to the tooth bars against the resistance of said resilient means.

20. The invention according to claim 19 and said driving means comprising a crank connected to said member at a point spaced from said resilient means.

21. The invention according to claim 19 and said driving means comprising crank means connected to said member intermediate said resilient means.

22. The invention according to claim 19 and said driving means disposed in stressing relation to said resilient means through said member.

References Cited in the file of this patent

UNITED STATES PATENTS

| 766,669 | Conroy | Aug. 2, 1904 |
| 2,681,543 | Richey | June 22, 1954 |